United States Patent
Liedenbaum

(10) Patent No.: US 6,874,686 B2
(45) Date of Patent: Apr. 5, 2005

(54) OPTICAL READOUT DEVICE

(75) Inventor: Coen Theodorus Hubertus Fransiscus Liedenbaum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/498,297

(22) PCT Filed: Dec. 5, 2002

(86) PCT No.: PCT/IB02/05212

§ 371 (c)(1), (2), (4) Date: Jun. 9, 2004

(87) PCT Pub. No.: WO03/052749

PCT Pub. Date: Jun. 26, 2003

(65) Prior Publication Data

US 2005/0011950 A1 Jan. 20, 2005

(30) Foreign Application Priority Data

Dec. 14, 2001 (EP) .......................... 01204851

(51) Int. Cl.$^7$ .................................. G06K 7/10
(52) U.S. Cl. ................... 235/454; 235/456
(58) Field of Search .......................... 235/454, 455, 235/456, 462.04, 462.06, 494

(56) References Cited

U.S. PATENT DOCUMENTS

| | | | | | |
|---|---|---|---|---|---|
| 5,420,849 | A | * | 5/1995 | Matsueda | 235/454 |
| 5,499,231 | A | * | 3/1996 | Fennema et al. | 369/94 |
| 5,986,998 | A | * | 11/1999 | Park | 369/94 |
| 6,279,830 | B1 | * | 8/2001 | Ishibashi | 235/454 |
| 6,373,805 | B1 | * | 4/2002 | Song | 369/100 |
| 6,457,651 | B2 | * | 10/2002 | Paul et al. | 235/456 |

* cited by examiner

Primary Examiner—Michael G. Lee
Assistant Examiner—Uyen-Chau N. Le
(74) Attorney, Agent, or Firm—Michael E. Belk

(57) ABSTRACT

An optical readout device for reading out data from an electroluminescent data storage medium, comprising: a driving circuit (4) for driving the radiation-emitting material with a time-varying applied signal; a radiation detector array (6) for detecting radiation emitted from the data storage medium and for generating radiation detection signals; and a processing part (8) arranged to process the detection signals to distinguish a detection signal resulting from reading different types of marks in the data storage medium in dependence on a timing reference signal.

18 Claims, 2 Drawing Sheets

OPTICAL READOUT DEVICE

This invention relates to an optical readout device, in particular to an optical readout device for reading out data from a data storage medium comprising a radiation-emitting material which radiates under the influence of an applied signal. Various phenomena are known whereby materials emit radiation under the influence of an applied signal. One example is electroluminescence whereby materials emit radiation under the influence of an applied voltage signal. Another is fluorescence whereby materials emit radiation under the influence of an exciting radiation signal.

International patent publication no. WO-A-0048197 describes an electroluminescent multi-layer optical information storage medium which has multiple information layers. On each layer, information is stored in the form of an electroluminescent material. The information is organized into regions called pages. A specific page on a specific layer can be addressed through electrodes integrated into the medium. Data is coded into the medium in the form of electroluminescent characteristics, which vary in accordance with a data value being read out.

It would be desirable to increase the data density in data storage systems using data recording mediums capable of emitting radiation under an applied signal.

In accordance with the present invention there is provided an optical readout device for reading out data from a radiation-emitting data storage medium, said medium comprising a radiation-emitting material holding data in the form of data storage areas capable of emitting varying amounts of radiation on application of an applied signal, said data storage areas including at least a first type of data storage area and a second type of data storage area indicating different first and second data values, said device comprising:

a driving part for driving the radiation-emitting material with an applied signal;

a radiation detecting part for detecting radiation emitted from said data storage areas and for generating radiation detection signals; and a processing part for processing said detection signals to generate data signals corresponding to the data stored in the medium;

wherein said driving part is arranged to generate a time-varying applied signal, and wherein the processing part is arranged to process the detection signals to distinguish a detection signal resulting from reading said first type of data storage area from a detection signal resulting from reading said second type of data storage area in dependence on a temporal characteristic of the detection signals.

The invention provides an effective means for the read out of data from a data storage medium storing data in the form of areas having different levels of emissivity.

In a preferred embodiment, the invention implements a multi-level data coding scheme, in which at least three different levels of emissivity are encoded into the data storage medium. In implementing such a multi-level coding scheme, one method would be to use a detector array producing analogue signals, and to provide an analogue-to-digital converter for each of the different detectors to produce an appropriately digitized level and hence retrieve the stored information However, this would involve complex electronic circuitry for each detector, or alternatively reduce data-extraction speeds for the array as a whole. The use of the present invention allows, as a minimum, a single digital-to-analogue converter, or a single analogue-to-digital converter, to be used, thereby significantly reducing the complexity of the device.

A further advantage is that the scanning speed can be adjusted to adapt the device to different signal-to-noise ratios in the system, or the number of levels chosen in the multi-level coding scheme.

Further features and advantages of the invention will become apparent from the following description of preferred embodiments of the invention, given by way of example only and made with reference to the accompanying drawings, wherein.

Figure 1:
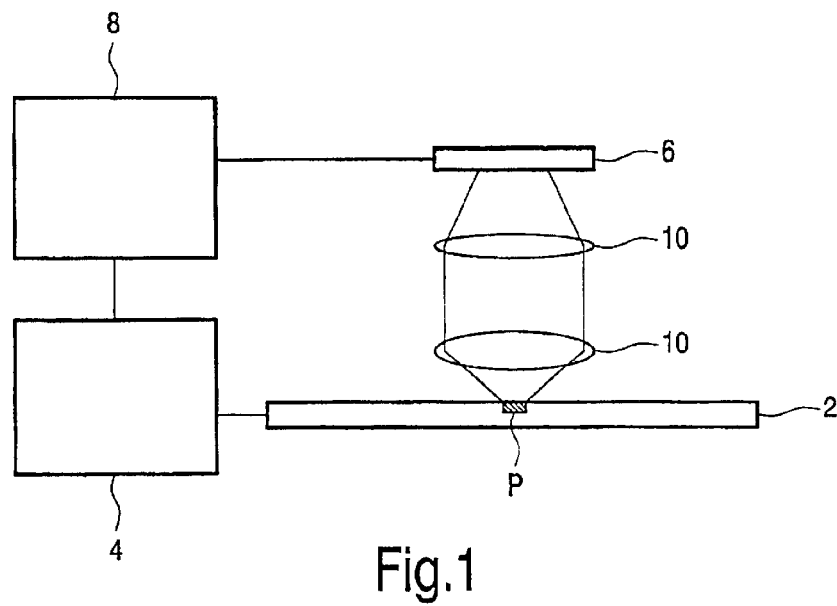
FIG. 1 is a schematic illustration of an optical read out device in accordance with an embodiment of the invention.

Referring now to FIG. 1, the invention relates to an optical read out device for reading out data from a radiation-emitting data storage medium 2. In one embodiment, the data storage medium 2 is an organic light emitting device (OLED) containing a planar layer of organic electroluminescent material, such as polyphenylene-vinylene (PPV) sandwiched between two planar electrode layers, at least the upper of which is formed of a transparent conductive material, such as indium tin oxide (ITO). Data is stored by locally modifying the strength of emission of the material in discrete data storage areas of the material. The strength of emission of the data storage areas is varied between data storage areas. Such variation can be achieved either by pre-patterning lithographically during the manufacture of the data storage medium, in which case the medium is of a read-only type, or by using a writing device, which may be combined with the read-out device of the present invention, including radiation light source, such as a laser beam or an ultraviolet light beam, to reduce the strength of emission in data areas selectively during a writing process, in which case the medium is of a singularly writable or multiply re-writable type.

The optical readout device also includes a driving circuit 4 for driving the radiation-emitting data storage medium 2 with an applied voltage signal which is applied across the electroluminescent layer by the electrodes of the medium 2. One voltage is applied across the entire data-carrying layer at any one time. The driving circuit 4 is adapted to produce a time-varying voltage signal to produce a time-varying radiation output from each of the data storage areas during a read cycle.

A radiation detector array 6 is adapted to detect radiation emitted from a selected area, referred to herein as a "page" P containing a plurality of individual data storage areas, referred to hereinafter as "marks". The detector 6 may be in the form of a complimentary metal oxide silicon (CMOS) sensor array or a charge coupled device (CCD) array.

A processing circuit 8 processes detection signals generated by the radiation detector 6 generate output data signals corresponding to the data stored in a page currently being read from the data storage medium 2, and controls operation of the drive circuit 4.

Optical system 10 is located in the optical readout device between the location of the data storage medium 2 and the radiation detector 6 to image the page P currently being read out from onto the detector array. The optical system is preferably such as to resolve an area (corresponding to the area of a mark) of a size which is close to a diffraction limited spot size for the radiation emitted by the data storage medium.

Figure 2:
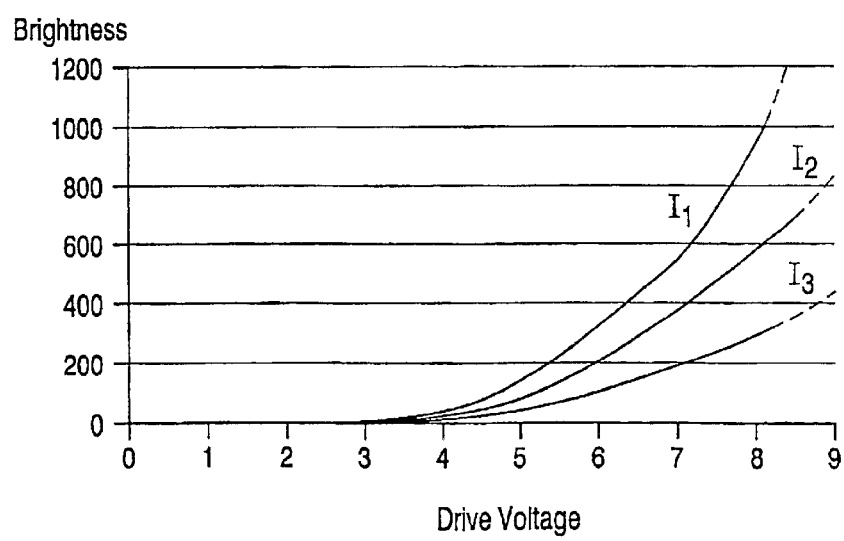
FIG. 2 is a graph showing relationships between drive voltage and brightness for an electroluminescent material.

FIG. 2 illustrates brightness levels $I_1$, $I_2$ and $I_3$ of the radiation output from three different types of mark in the data storage medium 2. Note that these are exemplary typical values, as used in one embodiment of the invention; however variation thereof will occur in dependence upon the material used. Note that the values along the vertical axis are given in Candelas/m², and the values along the horizontal axis are given in Volts.

A first type of mark, corresponding to a first data value, having a maximum emission characteristic $I_1$, has the highest brightness level at any selected drive voltage. A second type of mark, corresponding to a second data value, has an intermediate emission characteristic having an intermediate brightness level $I_2$, at any selected drive voltage. A third type of mark, corresponding to a third data value, having a lowest emission characteristic $I_3$ has the lowest brightness level at any selected drive voltage. Each of the characteristics has a brightness which increases with increasing levels of drive voltage. The emission characteristics of the different marks, under the drive voltage as shown, increase generally exponentially in brightness with drive voltage.

Figure 3:
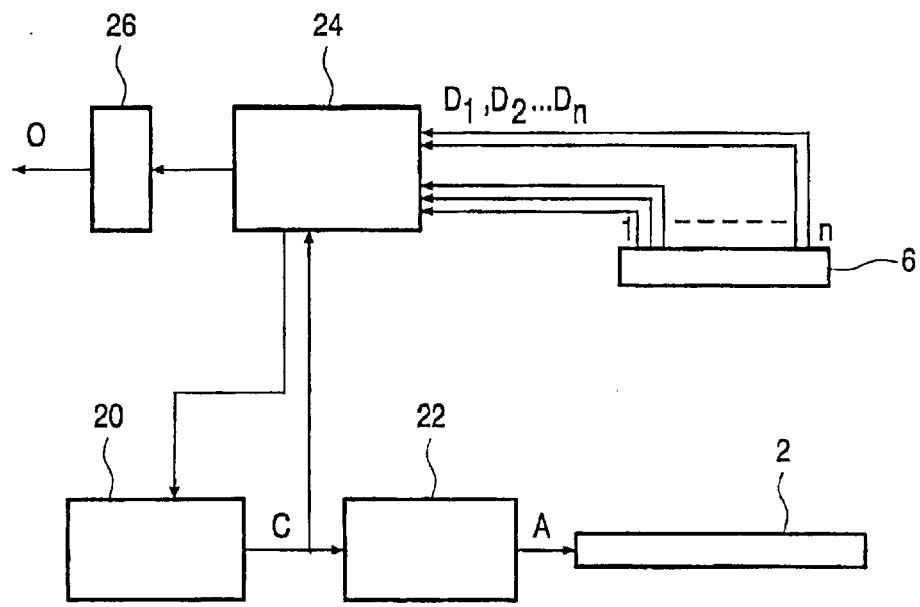
FIG. 3 is a schematic illustration showing further details of the arrangements shown in FIG. 1.

FIG. 3 illustrates elements of the drive circuit 4 and the processing circuit 8 in one embodiment of the invention in greater detail. In this embodiment, the drive circuit 4 includes a counting signal generator providing a counting signal C to a digital-to-analogue (D/A) converter 22. The counting signal C is incremented periodically, at regular intervals, during a read cycle. The digital-to-analogue converter generates a continually-varying applied voltage signal A in accordance with the received counting signal C, which is applied to the electrodes of the data storage medium 2. The applied signal is preferably approximately linearly varying.

The data storage medium 2 includes a plurality of different types of data storage areas. In this embodiment, there are three different types of marks, corresponding to a three-level coding scheme. Each data storage area corresponds to a different data value, such that three different data values may be present in any particular data storage area. The number of different data values (in this example three) possible in any particular data storage area is referred to herein as the number of coding levels in the multi-level coding scheme. The counting signal generator 20 is adapted to generate a counting signal which varies with the frequency at least twice the number of coding levels of the data storage medium per read cycle.

The counting signal C is also supplied to a signal processor 24 which uses the counting signal to process detection signals from the detector array 6, and a sampling rate corresponding to the counting signal C. In order to allow for output level variations, within certain tolerances, allowed for each different mark type, the count signal preferably has a frequency at least four times that of the number of coding levels per read cycle, so that each mark type can be reliably distinguished.

The detector array 6 generates a different output signal $D_1$, $D_2$ ... $D_n$, for each pixel, or set of pixels, referred to herein as a detector, in the detector array corresponding to an area of each different mark in the page P currently being read. Each of these different detection signals is separately processed at the signal processor 24. The output of each detector in the detector array 6 increases during a read cycle as the amount of light output from each mark in the data storage medium 2 increases under the influence of the gradually increasing applied voltage signal A. The output from each detector reaches a saturation level at a certain time within the read cycle, corresponding with the mark type. Mark types which emit relatively large amounts of radiation emit radiation in such quantities as to cause saturation of the corresponding detector, at an early part of the read cycle. Conversely, mark types emitting relatively small amounts of radiation cause saturation in the corresponding detector, at a relatively late stage in the reading cycle, when the applied voltage A has increased sufficiently to cause saturation of the corresponding detector.

The signal processor 24 includes threshold level sensors corresponding to each detection signal $D_1$, $D_2$ ... $D_n$, which are triggered when the output from the corresponding detector nears saturation. On triggering of the threshold level sensor, the current count of the counting signal C is stored in latch memory 26 in a memory location corresponding to that of the location of the detector within detector array 6. The applied signal A is increased until such time as all threshold level sensors have been triggered, at which point the signal processor 24 initiates a new read cycle, to read adjacent page on the data storage medium 2. For each read cycle, an output data signal O is read out from the latch memory 26 to further data processing elements of the device in which the data read out components are installed.

Figure 4A:
FIGS. 4(A) to (C) are graphs showing detection signals from a detector in accordance with an embodiment of the invention.
Figure 4B:
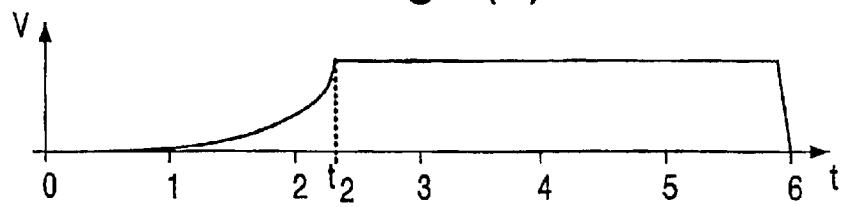
Figure 4C:
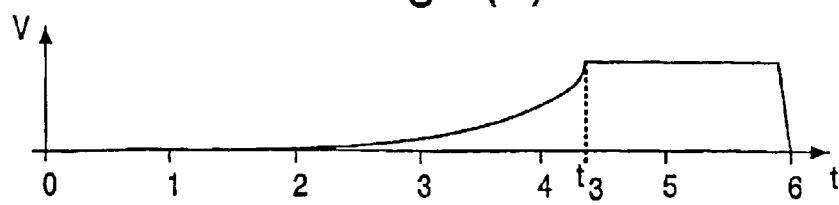

FIGS. 4(A) to (C) illustrate detection signals corresponding to each of the mark types generating the brightness curves $I_1$ to $I_3$ respectively shown in FIG. 2. All of FIGS. 4(A) to (C) show a time axis marked with the points of incrementation of the count signal C, the count signal C beginning at zero and incrementing in discrete integral steps to five during a single read cycle.

At the start of the read cycle, digital-to-analogue converter 22 generates the lowest applied voltage A of the read cycle, and begins to increase the applied voltage A linearly during the remainder of the read cycle. In this embodiment the number of coding levels is three and the frequency of the count signal is six increments per cycle. A mark creating a saturation level at the detector within the first two counting periods is determined to be a mark of a first type, having maximum electroluminescent characteristics. Correspondingly, a mark creating saturation at the detector within the third or fourth counting periods is determined to be a mark of a second type, having intermediate electroluminescent characteristics, whereas a mark creating saturation at the corresponding detector within the fourth or fifth counting periods is determined to be a mark of the third type, having lowest electroluminescent characteristics. The times at which saturation of the detector is sensed in signal processor 24 for each of these different mark types, $t_1$, $t_2$ and $t_3$ respectively, are shown in each of FIGS. 4(A) to (C). The signal processor 24 detects each of these times within the cycle by means of the threshold detector and determines the data value using the current count in the counting signal C before writing the corresponding data element into latch memory 26. After the reading of the mark in the page of lowest emissivity, the applied signal A is re-set to zero, and the output of each of the detectors returns to zero before the start of the next read cycle.

Note that FIGS. 4(A) to (C) illustrate output signals from radiation detector having generally linear output response characteristics. In an alternative embodiment, processing circuitry is associated with each detector to modify the detector characteristics, for example to produce a generally logarithmic output response characteristic, whereby the approach of the saturation point become more pronounced, i.e. the output response gradient near the point of saturation is increased in relation to a linear output response.

In the above described embodiment, the driving circuit 4 includes a signal generator 22 which generates the applied signal A in accordance with timing reference signals provided by the counting signal generator 20. Furthermore, the signal processor 24 also receives the counting signal, to synchronize processing of the detection signal $D_1, D_2 \ldots D_n$ with the applied signal A. In this case, the common timing source is in the form of a digital signal generator. In an alternative embodiment, the applied voltage A may be generated by an analogue signal generator forming the common timing source. The timing may be transferred via an analogue-to-digital converter in the signal processor, which receives the applied voltage A and generates corresponding digital timing reference signals therefrom. These digital timing reference signals are used by the signal processor 24 in synchronizing the processing of the detection signals $D_1, D_2 \ldots D_n$ with the applied signal A.

In a further embodiment, the processing of the detection signals, rather than being directly synchronized with the applied signal by use of a common timing source, synchronizes the processing of the detection signals with the applied signal by recognizing a characteristic of the detection signals. For example, the detection signals may include a predetermined signal characteristic, corresponding to a reference mark in the data storage medium, indicating the start of a read cycle. Hence, timing characteristics may be detected in the detection signals received from detector array 6 in order to process the detection signals to distinguish the various different types of marks. A clock signal generator within the signal processor 24 may be used to provide a time stamp corresponding to the saturation of each detector, which in combination with the reference timing is used to generate a corresponding digital data value in the output signal O.

The optical system 10 used in different embodiments may take various different forms. In one embodiment, the optical system images a single area of the data storage medium 2 which corresponds with the page currently being read. This type of optical system may be used in combination with a mechanical "step and scan" system which mechanically moves the data storage medium in relation to the optical system 10 to allow successive adjacent pages to be read during different read cycles.

In the above described embodiment, the data storage medium 2 includes an electroluminescent material arranged between two uniform electrodes, such that the entire electroluminescent layer is activated irrespective of the location of the page P currently being read. This simplifies the circuitry required in order to perform reading out of data from the data storage medium 2. However, in an alternative embodiment, the electroluminescent material is arranged between an array of addressable electrodes, such that an area corresponding to a page currently being read is selectively activated during each read out cycle. In this embodiment, the optical system 10 may be arranged to image a plurality of areas corresponding to different pages distributed across the data storage medium 2 simultaneously on to the detector array 6, with the image of each page area occupying the entire defective detector array area This reduces the need for mechanical scanning in the device. Namely, a plurality of pages may be scanned sequentially without forming mechanical scanning. In one example of this embodiment, all of the information carrying area on the medium, containing a plurality of pages of data, is simultaneously imaged on to the detector array 6, thereby avoiding any need for mechanical scanning.

In one embodiment of the invention, the detector array 6 is in the form of a one-dimensional detector array, consisting of a plurality of detectors arranged in a line. In a second embodiment of the invention, the detector array 6 is in the form of a two-dimensional array of detectors, having a rectangular formation.

Note that, whilst in the above-described embodiments, a three-level data coding scheme is used in the data storage medium, this is used for exemplary purposes only. Preferably, a higher number of data coding levels are used. The multilevel coding scheme may be selected to correspond for example to 8, 12, 16 or 32 bit data signals being read from each mark. On the other hand, the invention may also be applied in a binary data coding scheme. The number of coding levels used in practice will preferably depend on the signal-to-noise ratio in the system, whereby the number of coding levels chosen will be low enough to allow the different levels to be accurately resolved and otherwise as high as possible to increase to the data density in the recording medium.

The invention maybe embodied in data readout devices capable of reading different formats of data storage medium having different data coding schemes corresponding to different numbers of levels of electroluminescence. For example, one format of data storage medium may have three levels of electroluminescence corresponding to three different data coding schemes, whilst a second format of data storage medium may have four levels of electroluminescence corresponding to a four-level data coding scheme. In order to successfully read out data from each of these different formats of data storage medium, none of the components of the device need to be replaced. Rather, the signal processor 24 may operate in two different processing modes, corresponding to each different data storage medium format to be accommodated. Furthermore, the frequency of the timing reference signal may be varied in the different modes. For example, in the embodiment illustrated in FIG. 3, the count signal C may be increased, relative to the counting frequency when reading the three-level medium, when reading the four-level medium.

In the above embodiments, the light-emitting material is preferably an organic material such as one of, or a combination of, a number of known electroluminescent polymers. Examples include polypyridines, polypyridyvinylenes, polyphenylenes, polyphenylenevinylenes, polythiophenes, polyvinylcarbazoles, polyfluorenes, polynaphthalenevinylenes, polyphenyleneacetylenes, polyphenylenediacetylenes, polycyano-terephthalylidenes, polyphenylenebenzobisthiazoles, polybenzimidazobenzophenanthrolines, polypyridine copolymers, polypyridylvinylene copolymers, polyphenylene copolymers, polyphenylenevinylene copolymers, polythiophene copolymers, polyvinylcarbazole copolymers, polyfluorene copolymers, polynaphthalenevinylene copolymers, polyphenyleneacetylene copolymers, polyphenylenediacetylene copolymers, polycyanotherephthalylidene copolymers, polyphenylenebenzobisthiazole copolymers and polybenzimidazobenzophenanthroline copolymers.

Whilst in the above embodiments a single electroluminescent layer is described, the invention is also applicable to multi-layer mediums. In the case of read out from multi-layer mediums, the layers are selectively activated during read out.

The above embodiments are to be understood as illustrative examples of the invention. Further embodiments of the invention are envisaged. For example, instead of reading a data medium by electroluminescence, it is also possible to utilize the invention in relation to a fluorescent data storage and readout system. In this case, the data storage medium includes a layer of fluorescent material which is activated under the influence of an applied UV radiation signal which has the same time-varying characteristics as described above in relation to the applied voltage signal A. In this manner, readout from a multi-level coded fluorescent data storage medium is provided by use of the invention.

It is to be understood that any feature described in relation to one embodiment may also be used in other of the embodiments. Furthermore, equivalents and modifications not described above may also be employed without departing from the scope of the invention, which is defined in the accompanying claims.

What is claimed is:

1. An optical readout device for reading out data from a radiation-emitting data storage medium, said medium comprising a radiation-emitting material holding data in a form of data storage areas configured for emitting varying amounts of radiation on application of an applied signal, said data storage areas including at least a first type of data storage area and a second type of data storage area indicating different first and second data values, said device comprising:

a driving part for driving the radiation-emitting material with the applied signal;

a radiation detecting part for detecting radiation emitted from said data storage areas and for generating radiation detection signals; and a processing part for processing said detection signals to generate data signals corresponding to the data stored in the medium;

wherein said driving part is arranged to generate a time-varying applied signal, and wherein the processing part is arranged to process the detection signals to distinguish a detection signal resulting from reading said first type of data storage area from a detection signal resulting from reading said second type of data storage area in dependence on a temporal characteristic of the detection signals.

2. An optical readout device according to claim 1, wherein said driving part is adapted to generate a substantially continually varying applied signal.

3. An optical readout device according to claim 2, wherein said applied signal is approximately linear.

4. An optical readout device according to claim 1, wherein said driving part and said processing part are connected to a common timing source whereby the processing of the detection signals is synchronized with the applied signal.

5. An optical readout device according to claim 4, wherein said common timing source is a digital signal generator.

6. An optical readout device according to claim 5, comprising a digital-to-analogue converter for generating the applied signal.

7. An optical readout device according to claim 4, wherein said common timing source is an analogue signal generator.

8. An optical readout device according to claim 7, wherein said analogue signal generator is used to generate the applied signal.

9. An optical readout device according to claim 7, comprising an analogue-to-digital converter for generating a digital timing signal.

10. An optical readout device according to claim 1, wherein said processing part is adapted to synchronize the processing of the detection signals with the applied signal by recognizing a characteristic of the detection signals.

11. An optical readout device according to claim 1, wherein the device is adapted for the readout of data from a data storage medium comprising a radiation-emitting material holding data in the form of data storage areas at least a first type of data storage area, a second type of data storage area and a third type of data storage area.

12. An optical readout device according to claim 11, wherein said processing part is adapted to distinguish a detection signal resulting from reading said third type of data storage area from detection signals resulting from reading said first and second type of data storage area in dependence on a temporal characteristic of the detection signals.

13. An optical readout device according to claim 11, wherein the device is adapted for the readout of data from a first data storage medium, comprising a radiation-emitting material holding data in the form of a first plurality of different types of data storage area, and from a second data storage medium comprising a radiation-emitting material holding data in the form of a second plurality of different types of data storage area, the number of different types of data storage areas in said first and second medium being different.

14. An optical readout device according to claim 13, wherein said processing part is adapted to alter the processing of the detection signals in dependence upon whether data is being read out from said first data storage medium or said second data storage medium.

15. An optical readout device according to claim 1, wherein said radiation detecting part comprises a one-dimensional array of radiation detectors.

16. An optical readout device according to claim 1, wherein said radiation detecting part comprises a two-dimensional array of radiation detectors.

17. An optical readout device according to claim 1, wherein said radiation emitting material comprises an electroluminescent material and wherein said applied signal is a voltage signal.

18. An optical readout device according to claim 1, wherein said radiation emitting material comprises a fluorescent material and wherein said applied signal is a radiation signal.

* * * * *